United States Patent
Jao et al.

(10) Patent No.: US 9,746,866 B2
(45) Date of Patent: Aug. 29, 2017

(54) CONTROL CIRCUIT AND CONTROL SYSTEM

(71) Applicant: MEDIATEK INC., Hsin-Chu (TW)

(72) Inventors: Che-Yuan Jao, Hsinchu (TW);
Chen-Feng Chiang, Chiayi County (TW)

(73) Assignee: MEDIATEK INC., Hsin-Chu (TW)

( * ) Notice: Subject to any disclaimer, the term of this patent is extended or adjusted under 35 U.S.C. 154(b) by 110 days.

(21) Appl. No.: 14/599,553

(22) Filed: Jan. 19, 2015

(65) Prior Publication Data

US 2015/0338870 A1 Nov. 26, 2015

Related U.S. Application Data

(60) Provisional application No. 62/001,640, filed on May 22, 2014.

(51) Int. Cl.
| | |
|---|---|
| *H03K 3/00* | (2006.01) |
| *G05F 3/02* | (2006.01) |
| *G06F 1/32* | (2006.01) |
| *G06F 1/26* | (2006.01) |

(52) U.S. Cl.
CPC ............... *G05F 3/02* (2013.01); *G06F 1/26* (2013.01); *G06F 1/3296* (2013.01); *Y02B 60/1285* (2013.01)

(58) Field of Classification Search
None
See application file for complete search history.

(56) References Cited

U.S. PATENT DOCUMENTS

| | | | |
|---|---|---|---|
| 8,026,745 B2 | 9/2011 | Scott | |
| 8,476,940 B2* | 7/2013 | Kumar | G11C 7/1057 327/108 |
| 8,723,593 B2 | 5/2014 | Inoue | |
| 8,959,413 B2 | 2/2015 | Marcille | |
| 2002/0113628 A1* | 8/2002 | Ajit | G11C 5/14 327/108 |
| 2010/0176848 A1* | 7/2010 | Du | G11C 7/1051 327/108 |
| 2011/0298494 A1 | 12/2011 | Bringivijayaraghavan | |
| 2011/0316505 A1* | 12/2011 | Shrivastava | H03K 19/018521 323/282 |

(Continued)

FOREIGN PATENT DOCUMENTS

| | | |
|---|---|---|
| CN | 102474299 A | 5/2012 |
| CN | 103312282 A | 9/2013 |

(Continued)

*Primary Examiner* — Lincoln Donovan
*Assistant Examiner* — Khareem E Almo
(74) *Attorney, Agent, or Firm* — Winston Hsu

(57) ABSTRACT

One embodiment of the present application discloses a control circuit comprising a driving circuit which comprises a voltage adjusting circuit, a first transistor and a second transistor. The first transistor comprises: a first terminal; a second terminal; and a control terminal, for receiving a bias voltage generated from at least operating voltage of the control circuit. The second transistor comprises: a first terminal, coupled to a second terminal of the first transistor; a second terminal, for receiving a first predetermined voltage; and a control terminal, for receiving the control voltage. A control system comprising the control circuit is also disclosed.

17 Claims, 17 Drawing Sheets

(56) References Cited

U.S. PATENT DOCUMENTS

| | | | |
|---|---|---|---|
| 2013/0113542 A1* | 5/2013 | Lee | H03K 19/00315 327/333 |
| 2013/0141140 A1* | 6/2013 | Kumar | G11C 7/1057 327/108 |
| 2013/0162044 A1 | 6/2013 | Mangattur | |
| 2013/0241632 A1 | 9/2013 | Inoue | |
| 2014/0070876 A1* | 3/2014 | Paillet | G06F 1/26 327/538 |
| 2016/0202714 A1* | 7/2016 | Luria | G05F 1/56 713/300 |

FOREIGN PATENT DOCUMENTS

| | | | |
|---|---|---|---|
| EP | 2608441 A1 | 6/2013 |
| EP | 2 680 441 A2 | 1/2014 |
| EP | 2 680 441 A3 | 11/2014 |

* cited by examiner

US 9,746,866 B2

CONTROL CIRCUIT AND CONTROL SYSTEM

CROSS REFERENCE TO RELATED APPLICATIONS

This application claims the benefit of U.S. Provisional Application No. 62/001,640, filed on May 22, 2014, the contents of which are incorporated herein by reference.

BACKGROUND

The present application relates to a control circuit and a control system, and particularly relates to a control circuit and a control system that can provide different bias voltages for a driving circuit included therein.

FIG. 1 is a circuit diagram illustrating a conventional driving circuit 100. As illustrated in FIG. 1, the driving circuit 100 comprises transistors TP1, TP2, TN1 and TN2, which are coupled in series and coupled to an input/output pad I/O. The transistor TP2 receives a pull up signal PU. If the pull up signal PU controls the transistor TP2 to be active, a voltage at the output terminal OT is pulled up. The transistor TP1 receives a bias voltage Vb1 to operate in a suitable state.

Similarly, the transistor TN2 receives a pull down signal PD. If the pull down signal PD controls the transistor TN2 to be active, a voltage at the output terminal OT is pulled down. The transistor TN1 receives a bias voltage Vb2 to operate in a suitable state.

However, the bias voltage Vb1 or Vb2 must be provided by another independent bias voltage source which may occupy more circuit regions. Also, the bias voltage is always a fixed value thus cannot meet different requirements.

SUMMARY

One objective of the present application is providing a control circuit that can provide different bias voltages to a driving circuit included therein.

One objective of the present application is providing a control system that can provide different bias voltages to a control IC included therein.

One embodiment of the present application discloses a control circuit comprising a driving circuit which comprises a voltage adjusting circuit, a first transistor and a second transistor. The first transistor comprises: a first terminal; a second terminal; and a control terminal, for receiving a bias voltage generated from at least operating voltage of the control circuit. The second transistor comprises: a first terminal, coupled to a second terminal of the first transistor; a second terminal, for receiving a first predetermined voltage; and a control terminal, for receiving the control voltage.

Another embodiment of the present application discloses a control system comprising a power managing IC, and a control IC. The power managing IC comprises a power providing terminal for providing a first predetermined voltage. The control IC comprises: at least one transistor; a power receiving terminal, for receiving the first predetermined voltage; and a bias voltage receiving terminal, for receiving a bias voltage generated from at least operating voltage of the control IC, wherein the bias voltage is applied to bias at least one transistor in the control IC.

Another embodiment of the present application discloses a control system comprising a power managing IC and a control IC. The power managing IC comprises a power providing terminal for providing a first predetermined voltage. The control IC comprises: at least one transistor; a power receiving terminal, for receiving the first predetermined voltage; a core voltage receiving terminal, for receiving a core voltage; a core device, receiving the core voltage; and a bias voltage generating circuit, for generating a bias voltage applied to bias the transistor in the control IC according to the core voltage. The bias voltage equals to the first predetermined voltage minus the core voltage.

In view of above-mentioned embodiments, the driving circuit, the control circuit and the control system can provide bias voltages meeting different requirements, thus the applicability of the driving circuit, the control circuit and the control system is extended.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
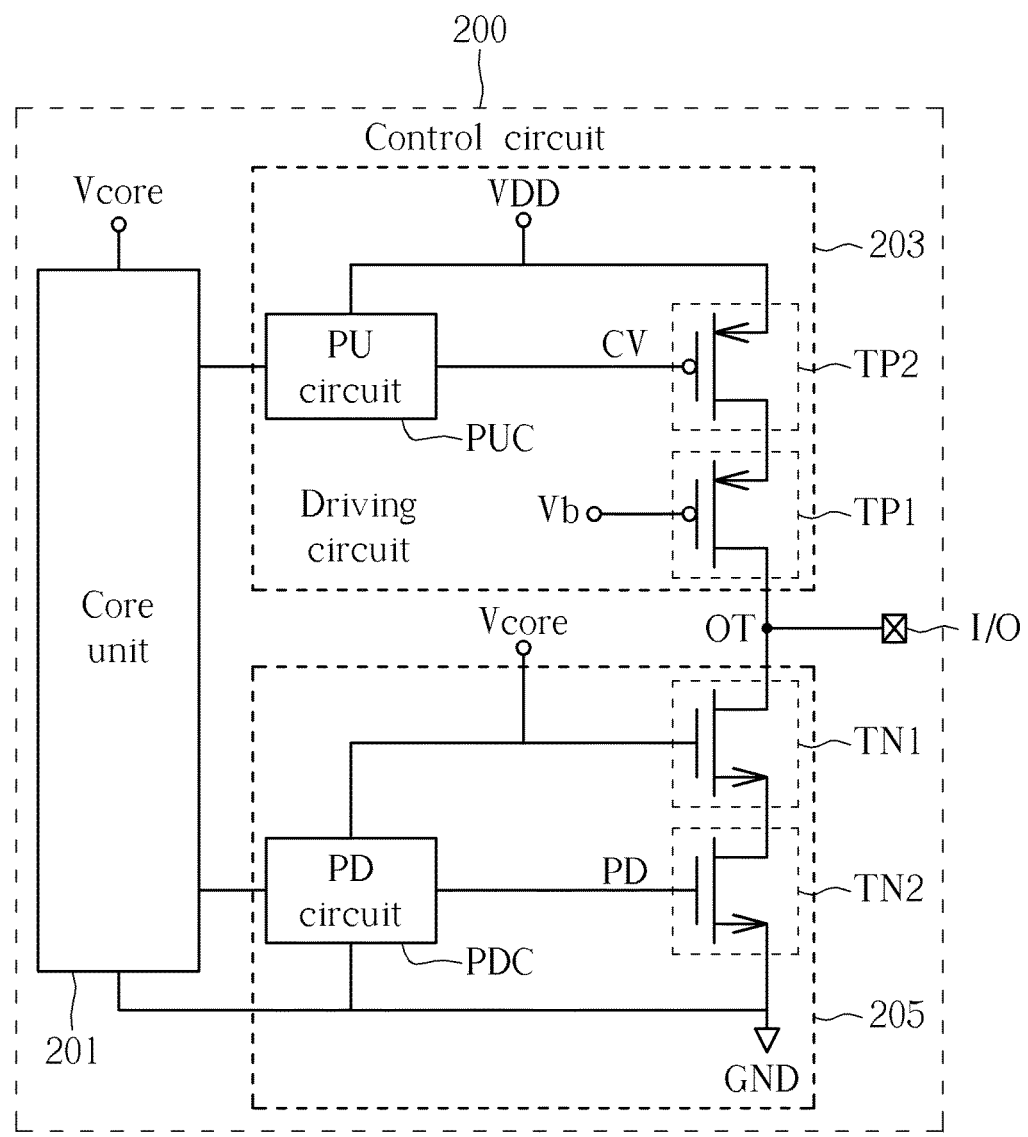
FIG. 2 is a circuit diagram illustrating a control circuit according to one embodiment of the present application.

FIG. 2 is a circuit diagram illustrating a control circuit 200 according to one embodiment of the present application. As illustrated in FIG. 2, the control circuit 200 comprises a core unit 201 and a driving circuit-205. The core unit 201, which receives and operates at a core voltage Vcore, is a device for higher speed operations and lower voltage operations. Accordingly, the core device can be applied as a circuit providing more functions, such as a controller. Comparing with an I/O (input/output) device applied for the input/output pad, the core unit has thinner oxides.

Figure 1:
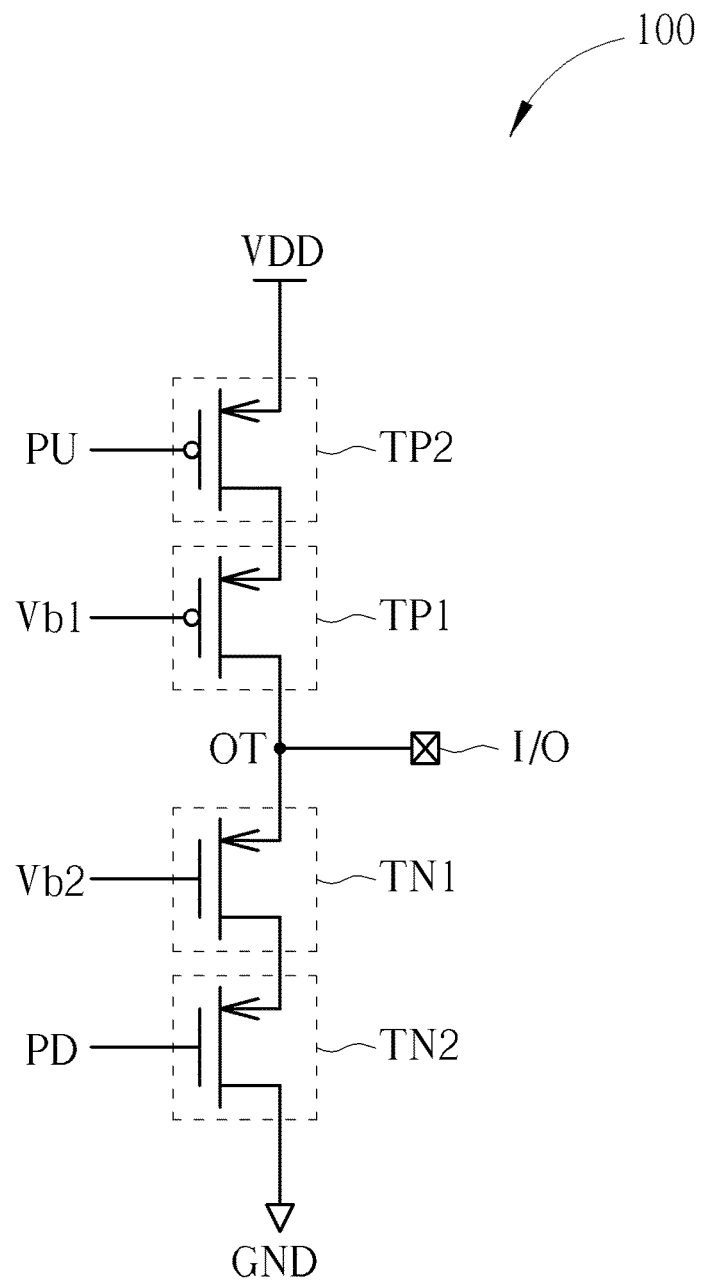
FIG. 1 is a circuit diagram illustrating a conventional driving circuit.

The driving circuit 203 is a pull up module in this example, which comprises a pull up circuit PUC (i.e. a voltage adjusting circuit) for generating a control voltage CV (i.e. the pull up signal PU in FIG. 1), a transistor TP1 and a transistor TP2. The transistor TP1 and the transistor TP2 are PMOSFETs in this example. The transistor TP1 comprises: a first terminal (drain terminal) coupled to the input/output pad I/O; a second terminal (source terminal); and a control terminal (gate terminal) for receiving a bias voltage Vb generated from at least operating voltage of the control circuit 200. The transistor TP2 comprises: a first terminal (drain terminal), coupled to a second terminal of the first transistor TP1; a second terminal (source terminal), for receiving a predetermined voltage VDD; and a control terminal (gate terminal), for receiving the control voltage CV.

In one embodiment, the predetermined voltage VDD meets one of following specs: DDR3, DDR3L, LPDDR3, DDR4, LPDDR4, GPIO. Corresponding to the spec, a value of the bias voltage Vb can equal to the core voltage Vcore, the predetermined voltage minus the core voltage VDD- Vcore, or a ground voltage GND. Please note either the core voltage Vcore, the predetermined voltage minus the core voltage VDD-Vcore or the ground voltage GND is an operating voltage of the control circuit 200. Accordingly, the bias voltage Vb is generated from the operating voltages of the control circuit 200.

The following table T1 depicts the examples of the predetermined voltage VDD and the bias voltage Vb corresponding to different specs. However, these values are only examples and do not mean to limit the scope of the present application.

| T1 | | |
|---|---|---|
| VDD | Vb | Spec |
| 1.5 V | VDD-Vcore | DDR3 |
| 1.35 V | VDD-Vcore or GND | DDR3L |
| 1.2 V | GND | LPDDR3/DDR4 |
| 1.1 V | GND | LPDDR4 |
| 1.8 V | Vcore | GPIO |

In this embodiment, the control circuit 200 further comprises a pull down module 205, which can be regarded as a driving circuit as well, comprising a pull down circuit PDC, which is also as a voltage adjusting circuit, a transistor TN1 and a transistor TN2. The transistor TN1 and the transistor TN2 are NMOSFETs in this embodiment. Please note, in one embodiment, the transistor TN1 receives the core voltage Vcore for biasing. However, if the concept of the driving circuit 203 is applied to the pull down module 205. The voltage received by the control terminal of the transistor TN1 is replaced by a bias voltage generated from the operating voltages of the control circuit 200. In other embodiments, the driving circuit 203 may further comprise other circuits such as a level shifter or a buffer located between the core unit 201 and the pull up circuit PUC, or the pull down module 205 comprises other circuits such as a level shifter or a buffer located between the core unit 201 and the pull down circuit PDC. Such variation should also fall in the scope of the present application.

Please note, the driving circuit 203 is not limited to be applied to the control circuit illustrated in FIG. 2. Accordingly, a driving circuit provided by the present application can be summarized as: A driving circuit, comprising a voltage adjusting circuit (ex. the pull up circuit PUC for a pull up module 203, or the pull down circuit PDC for the pull down module 205) for generating a control voltage CV, comprising a first transistor (ex. the transistor TP1 for a pull up module, or the transistor TN1 for the pull down module 205) and a second transistor (ex. the transistor TP2 for a pull up module, or the transistor TN2 for the pull down module 205). The first transistor comprises: a first terminal; a second terminal; and a control terminal, for receiving a bias voltage (ex. Vb) generated from at least operating voltage of the control circuit. The second transistor comprises: a first terminal, coupled to a second terminal of the first transistor; a second terminal, for receiving a predetermined voltage (ex. VDD); and a control terminal, for receiving the control voltage (ex. CV).

Figure 3A:
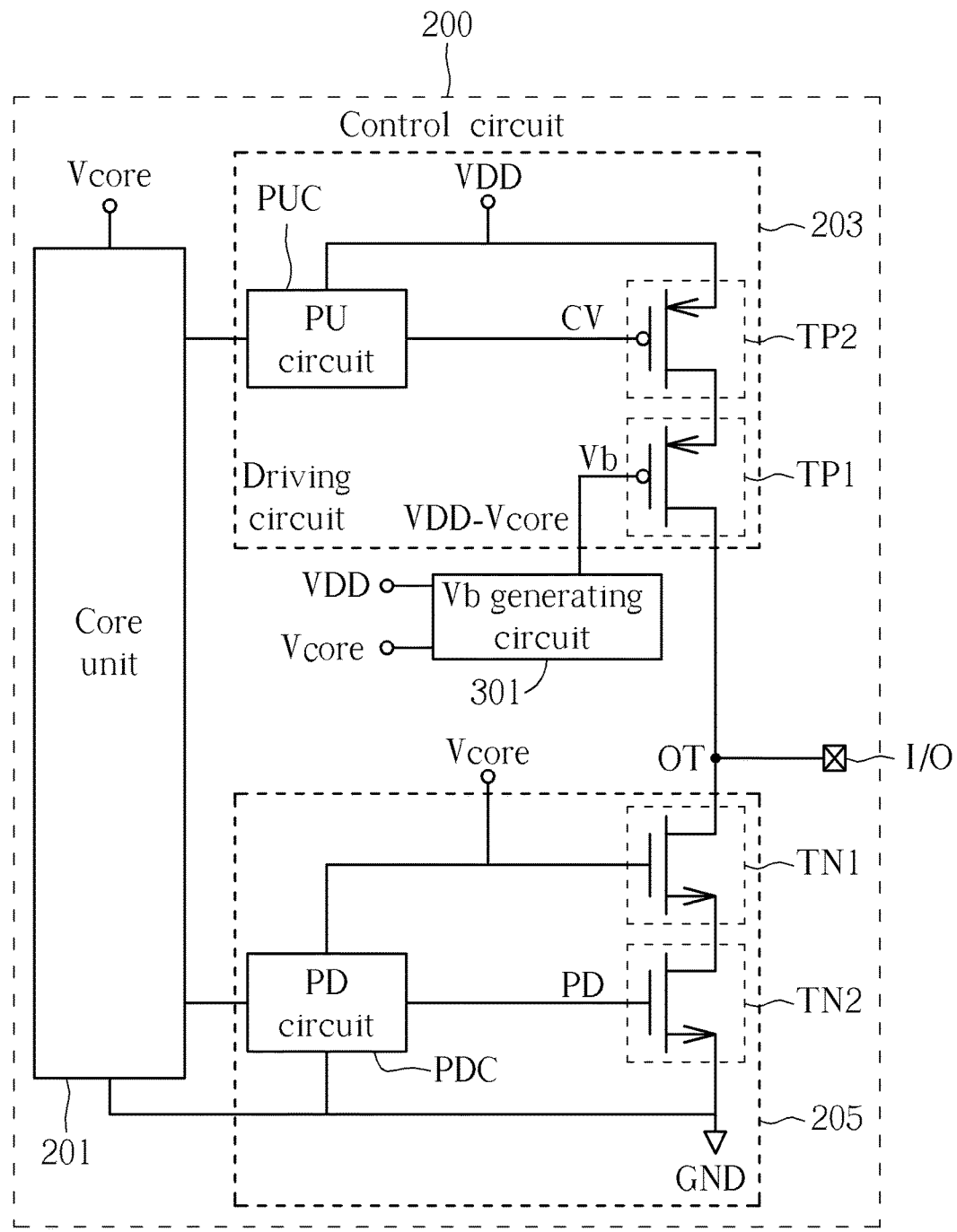
FIG. 3A, FIG. 3B, FIG. 4-FIG. 8 are circuit diagrams illustrating different examples for the embodiment illustrated in FIG. 2.
Figure 3B:
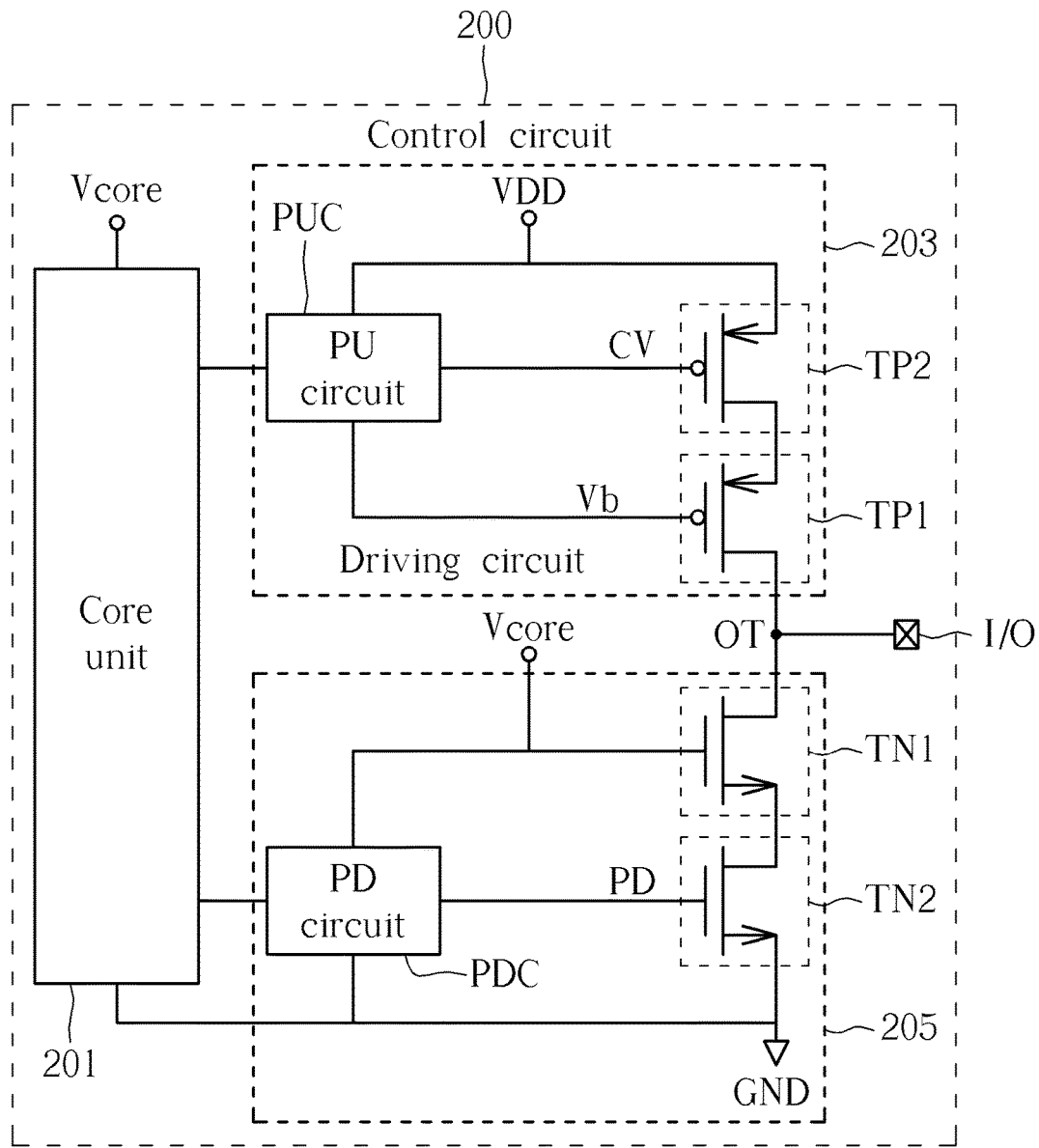
Figure 4:
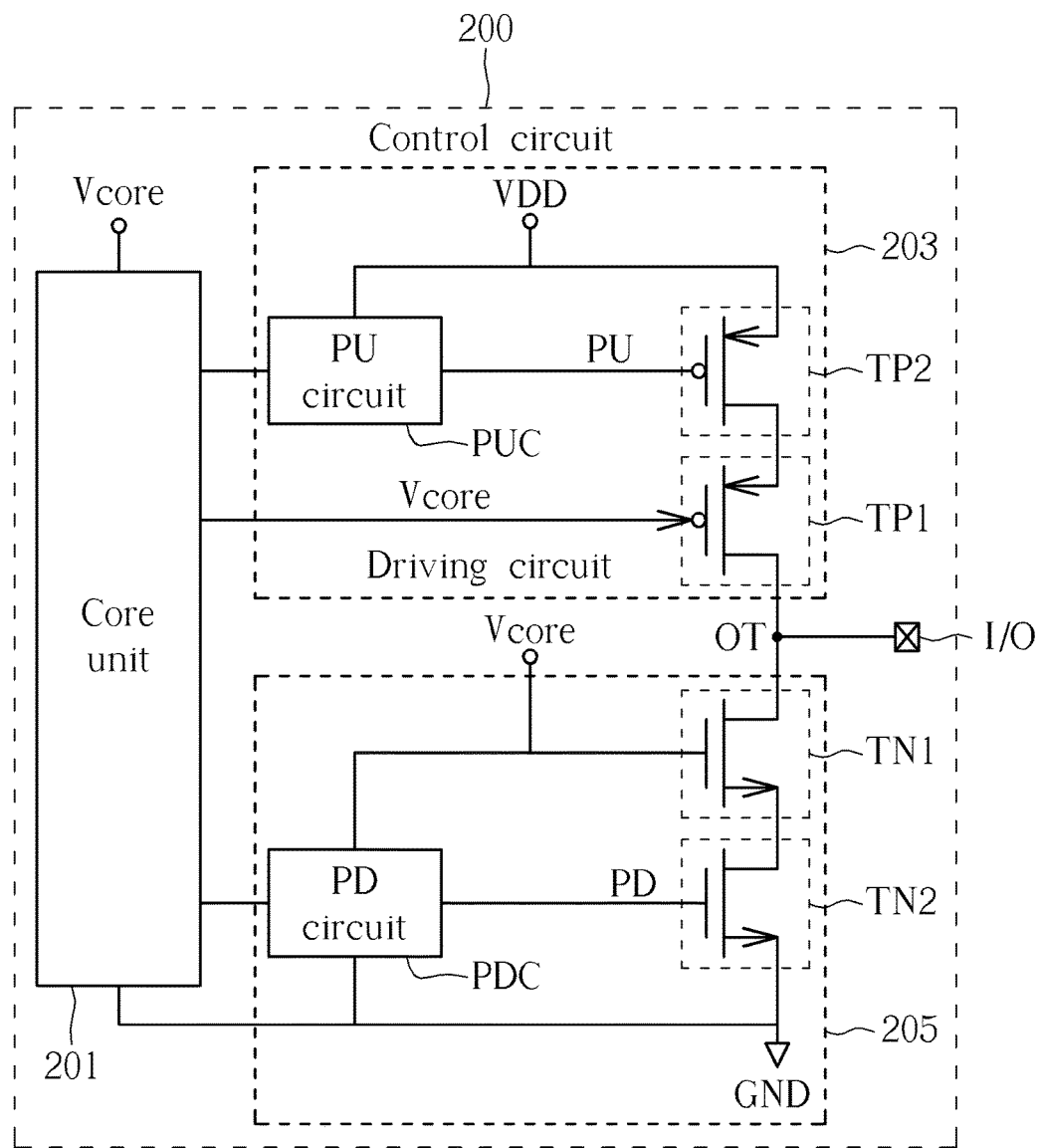

FIG. 3A, FIG. 3B, FIG. 4-FIG. 8 are circuit diagrams illustrating different examples for the embodiment illustrated in FIG. 2. These examples illustrate how to provide required bias voltages. In the example of FIG. 3A, a bias voltage generating circuit 301 is provided in the driving circuit 203. The biasing circuit receives the predetermined voltage VDD and the core voltage Vcore to generate a voltage equaling to the predetermined voltage minus the core voltage VDD-Vcore as a bias voltage Vb. The core voltage Vcore can come from the core unit 201 or an external source outside the control circuit 200. Please note the bias voltage generating circuit 301 can be incorporated into the pull up circuit PUC (i.e. the voltage adjusting circuit), as shown in FIG. 3B. The structure in FIG. 3B can also provide a bias voltage Vb equaling to the core voltage Vcore. Please note if the bias voltage Vb equals to the core voltage Vcore, it can be directly from the core unit, as illustrated in FIG. 4.

Figure 5:
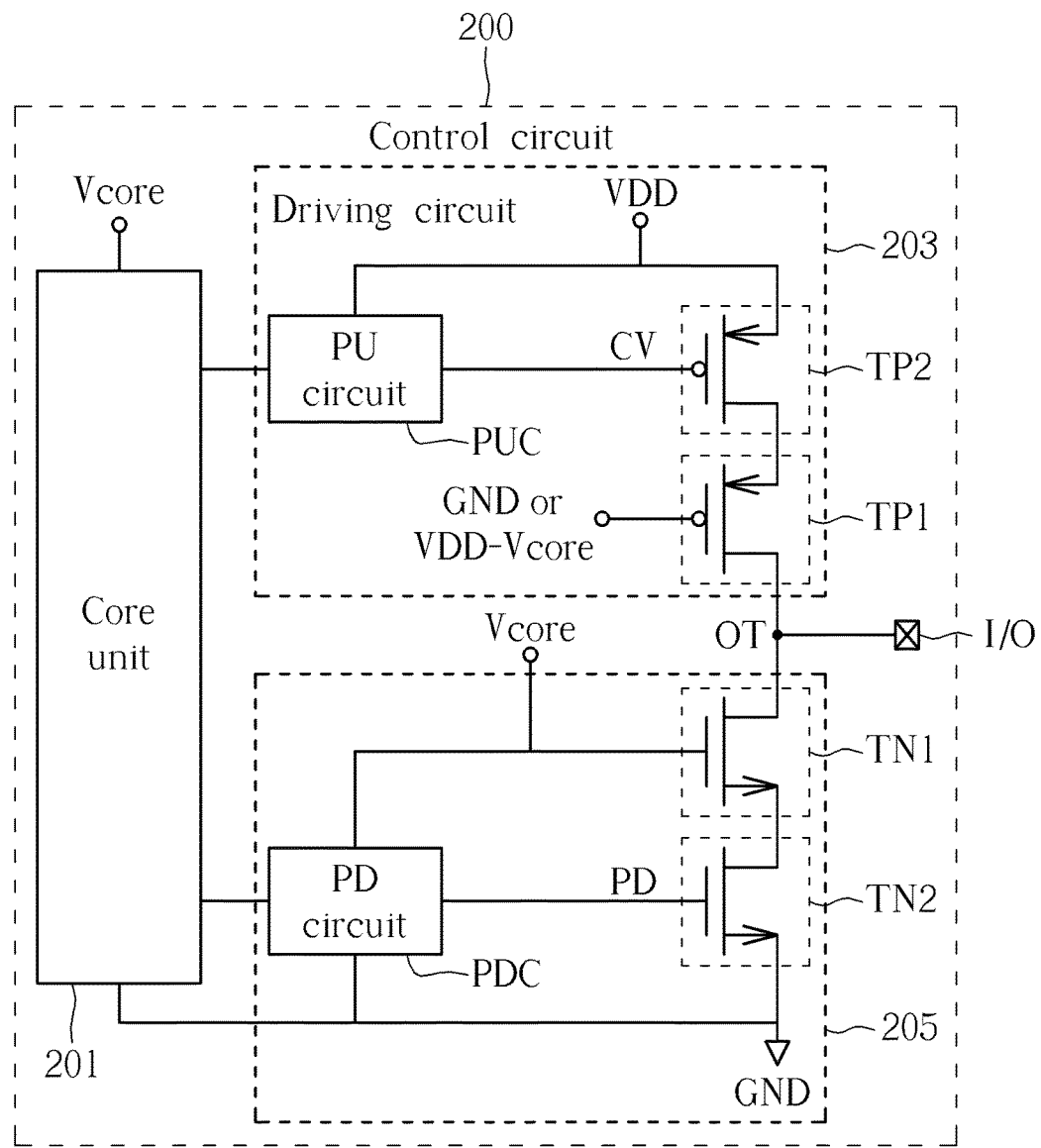
Figure 6:
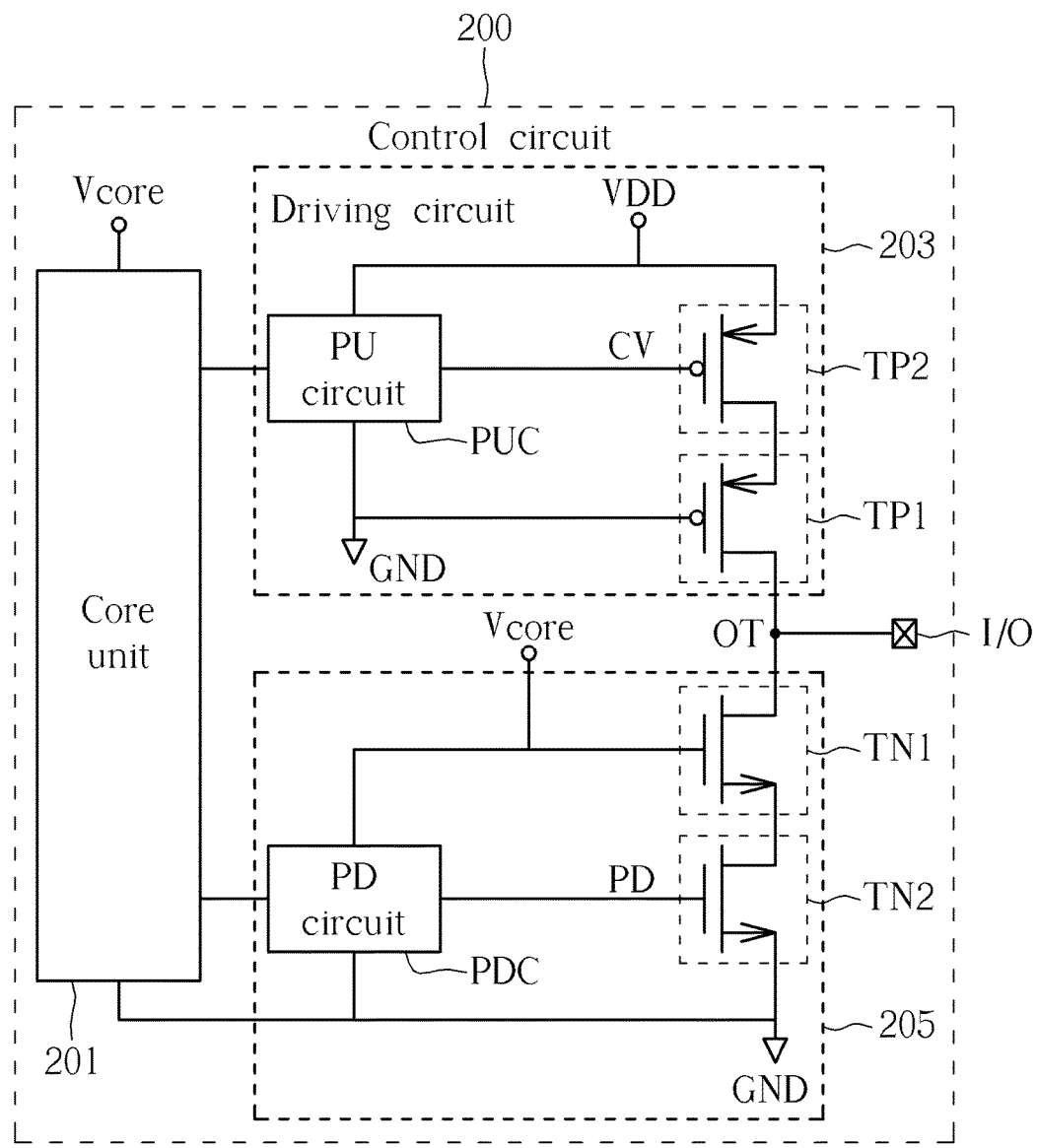
Figure 7:
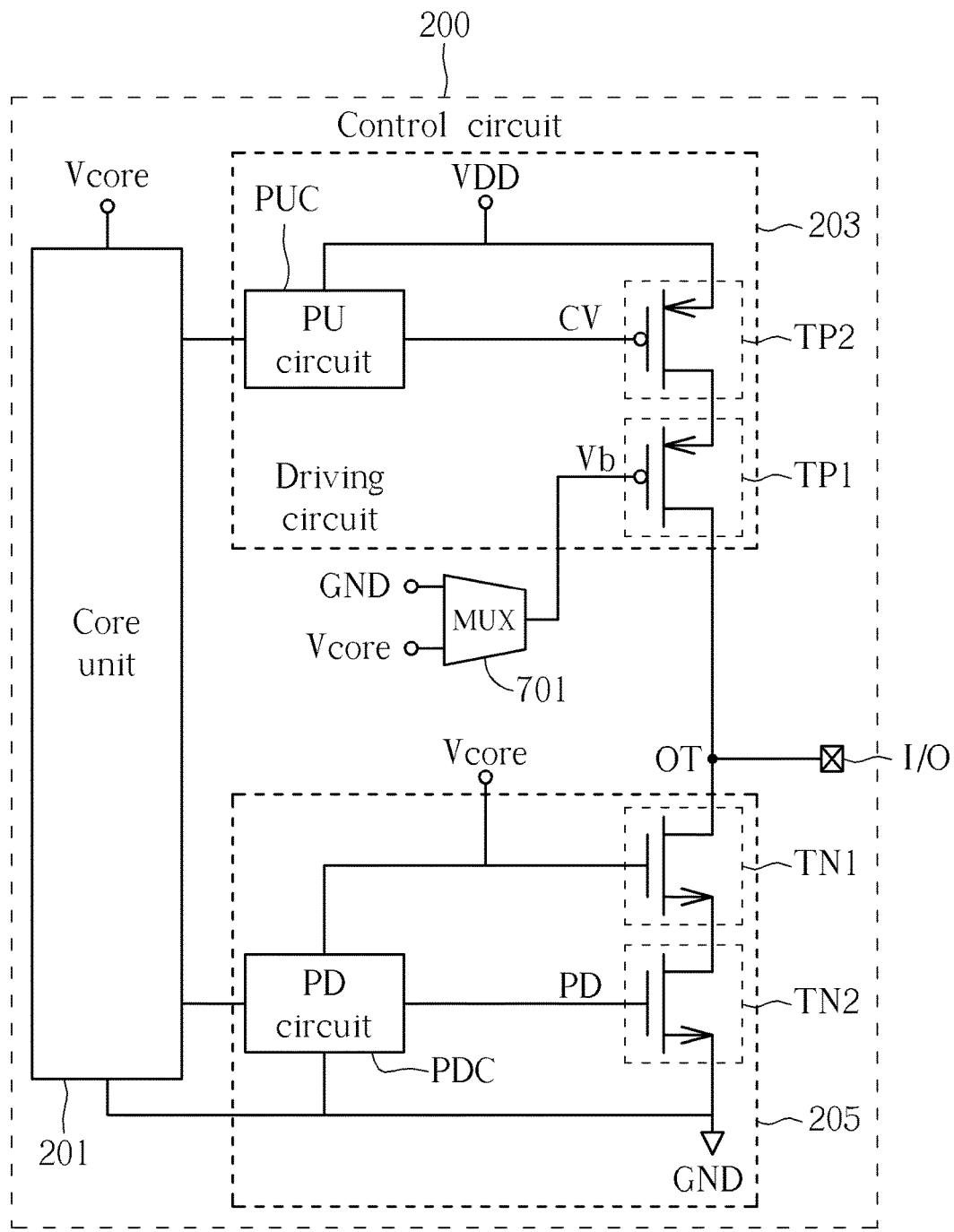

In the embodiment of FIG. 5, the bias voltage Vb is from an external source outside the control circuit 200, which will be described later. In such case, the bias voltage can equal to the ground voltage GND or VDD-Vcore. In the embodiment of FIG. 6, the bias voltage Vb equals to a ground voltage GND, and the pull up circuit PUC is also coupled to the ground voltage GND. In the embodiment of FIG. 7, a multiplexer 701 is further provided in the driving circuit 203 to select a required bias voltage from a plurality of candidate voltages. In this example, candidate voltages are the ground voltage GND and the core voltage Vcore, but not limited.

Figure 8:
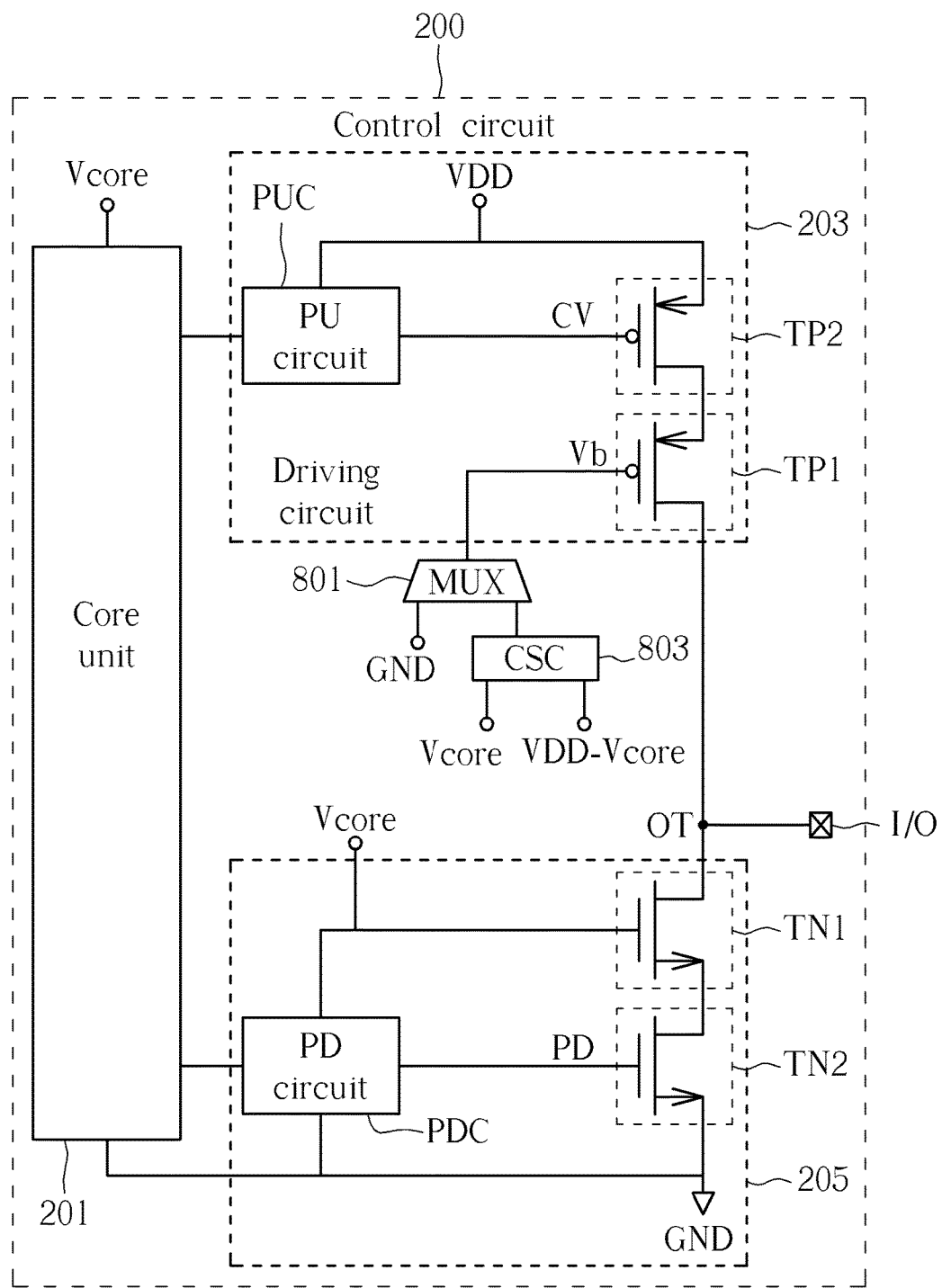

Further, in the embodiment of FIG. 8, the driving circuit further comprises a multiplexer 801 and a candidate voltage selecting circuit 803. The candidate voltage selecting circuit 803 outputs one of a plurality of candidate voltages (in this example, the core voltage Vcore, and the predetermined voltage minus the core voltage VDD-Vcore). The multiplexer 801 outputs the candidate voltage output from the candidate voltage selecting circuit 803 and a second predetermined voltage (the ground voltage GND in this example) as the bias voltage Vb. It will be appreciated that the candidate voltages are also related with the operating voltage of the control circuit.

Figure 9:
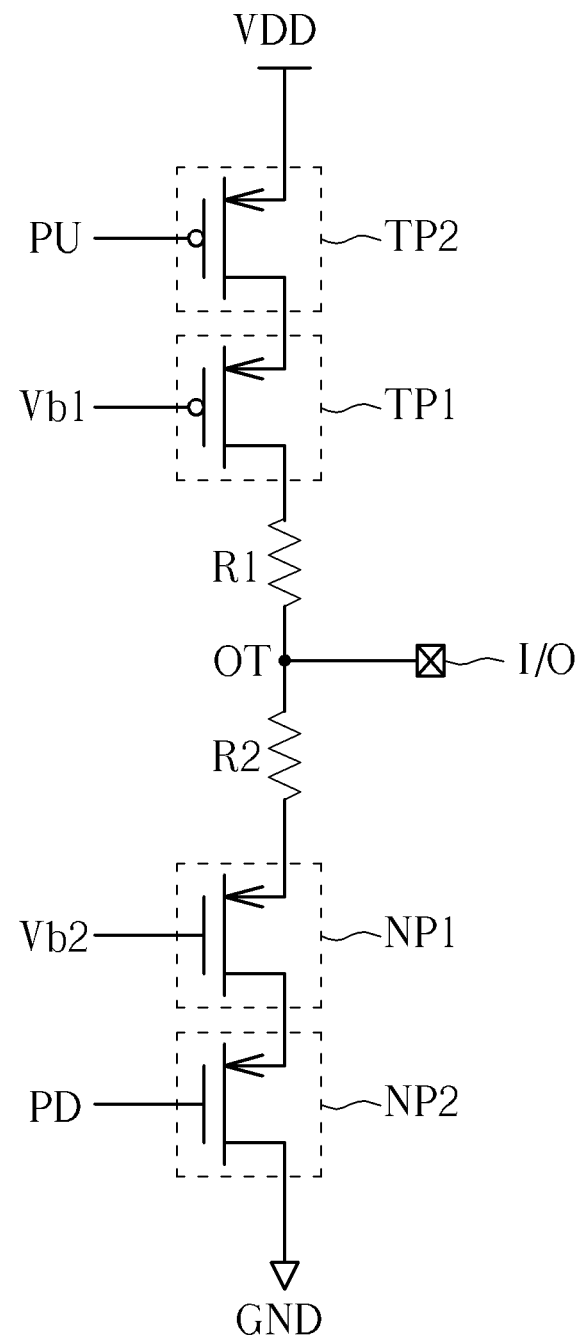
FIG. 9 and FIG. 10 are examples for the driving circuit illustrated in FIG. 2.
Figure 10:
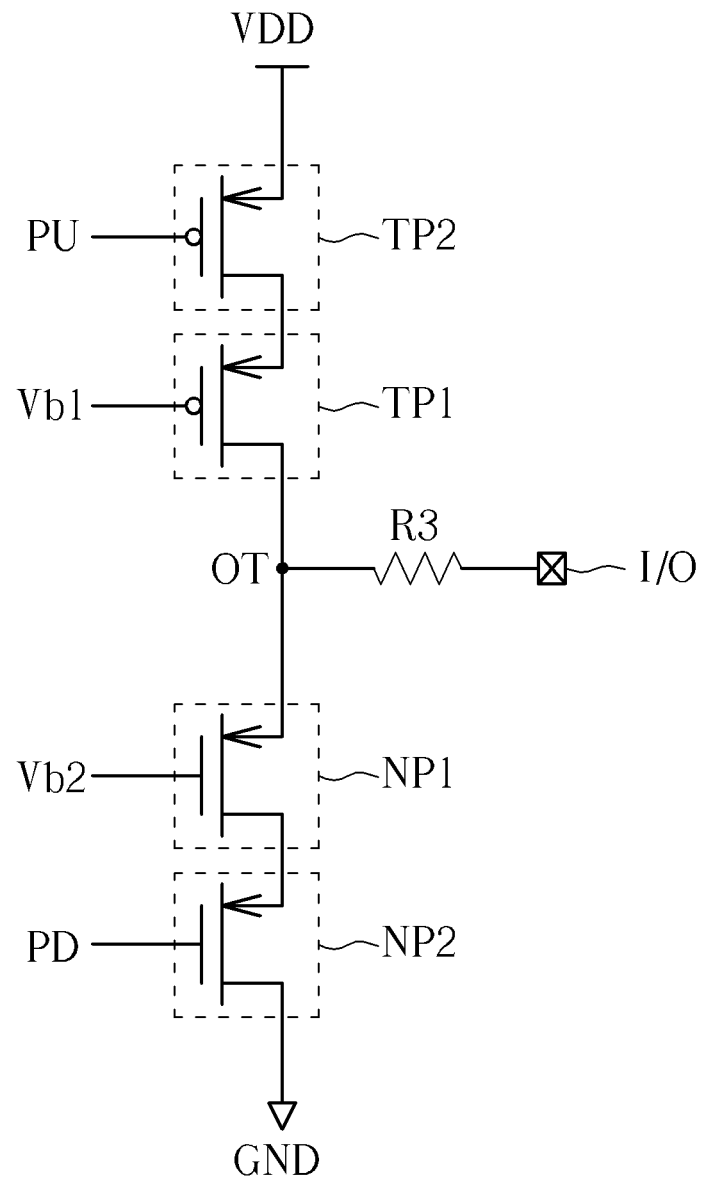

The structure for the driving circuit is not limited to above-mentioned embodiments. FIG. 9 and FIG. 10 are examples for the driving circuit illustrated in FIG. 2. As shown in FIG. 9, the driving circuit further comprises resistors R1 and R2, which are coupled in series and coupled to the input/output pad I/O. In the example of FIG. 10, the driving circuit comprises a resistor R3 coupled between the output terminal OT and the input/output pad I/O. Such variation should also fall in the scope of the present application.

Figure 11:
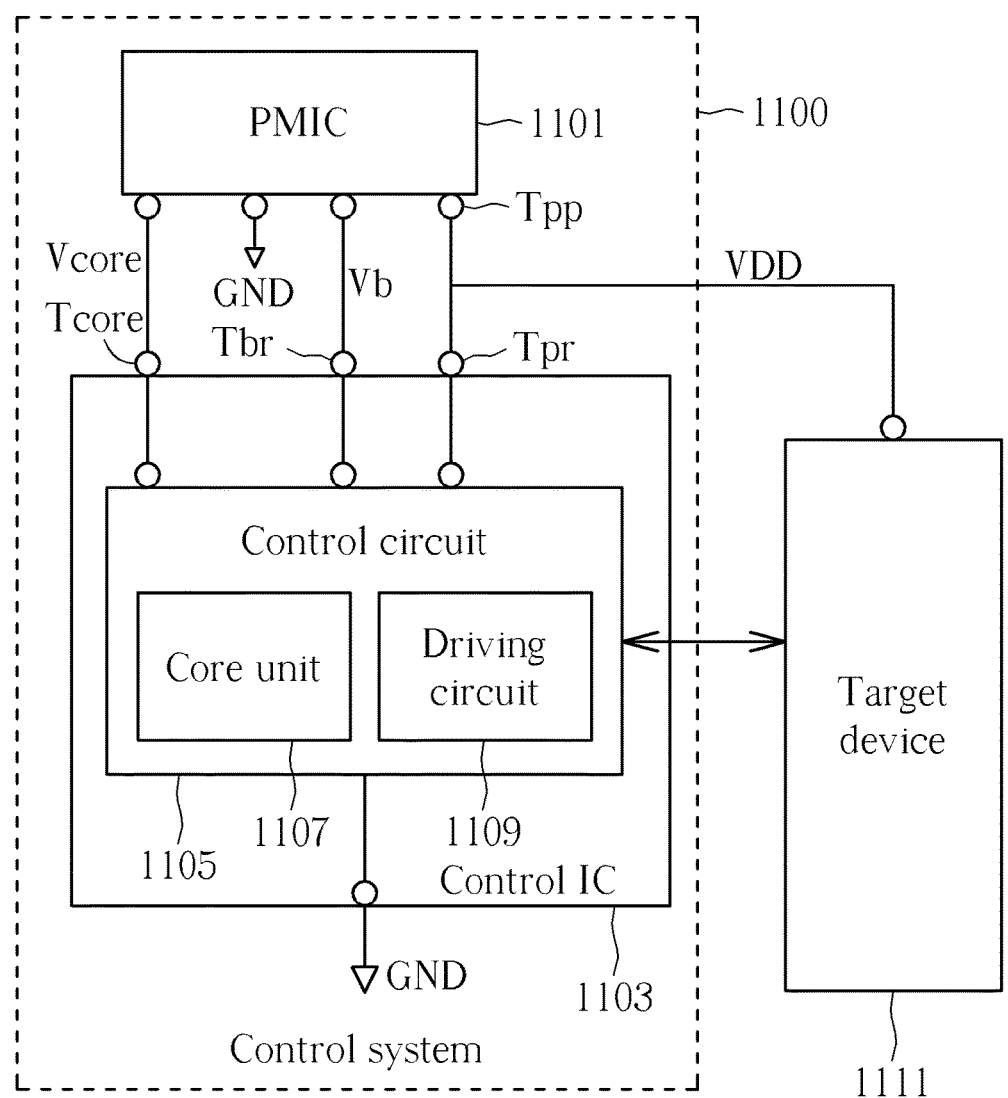
FIG. 11-FIG. 16 are block diagrams illustrating the control system according to embodiments of the present application.

The following embodiments will depict the above-mentioned embodiments in a system view. As illustrated in FIG. 11, the control system 1100 comprises a power managing IC (integrated circuit) 1101 and a control IC 1103. The power managing IC 1101 comprises a power providing terminal Tpp for providing a predetermined voltage VDD. The control IC 1103, which is applied to control a target device 1111 (ex. a DRAM die), comprises: a power receiving terminal Tpr for receiving the predetermined voltage VDD; and a bias voltage receiving terminal Tbr, for receiving a bias voltage Vb generated from at least operating voltage of the control IC 1103. The bias voltage Vb is applied to bias at least one transistor (ex. the transistor Tp1 in FIG. 2) in the control IC 1103.

In one embodiment, the control IC 1103 comprises a control circuit 1105, which may comprise the same structure as which of the control circuit 200 in FIG. 2. Accordingly, the control circuit 1105 receives the bias voltage Vb from the bias voltage receiving terminal Tbr and receives the predetermined voltage VDD from the power receiving terminal Tpr. In such embodiment, the control circuit 1105 can comprise a core unit 1107 (ex. a DRAM controller) and a driving circuit 1109, the same as the control circuit in FIG.

2. The core unit 1107 can be the same as the core unit 201 in FIG. 2, and the driving circuit 1107 can comprise a structure the same as which of the driving circuit 203 in FIG. 2, but not limited. Also, the control IC 1103 can further comprise a core voltage receiving terminal Tcore to receive a core voltage Vcore from the power managing IC 1101 and transmits the core voltage Vcore to the control circuit 1105. Please note if the control IC 1103 does not comprise the core unit 1107, the core voltage receiving terminal Tcore can be omitted.

In the embodiment of FIG. 11, the control IC 1103 receives the bias voltage Vb from the power managing IC 1101 (ex. the embodiment in FIG. 5). In such case, the bias voltage Vb can equal to the core voltage Vcore or the predetermined voltage minus the core voltage VDD-Vcore.

Figure 12:
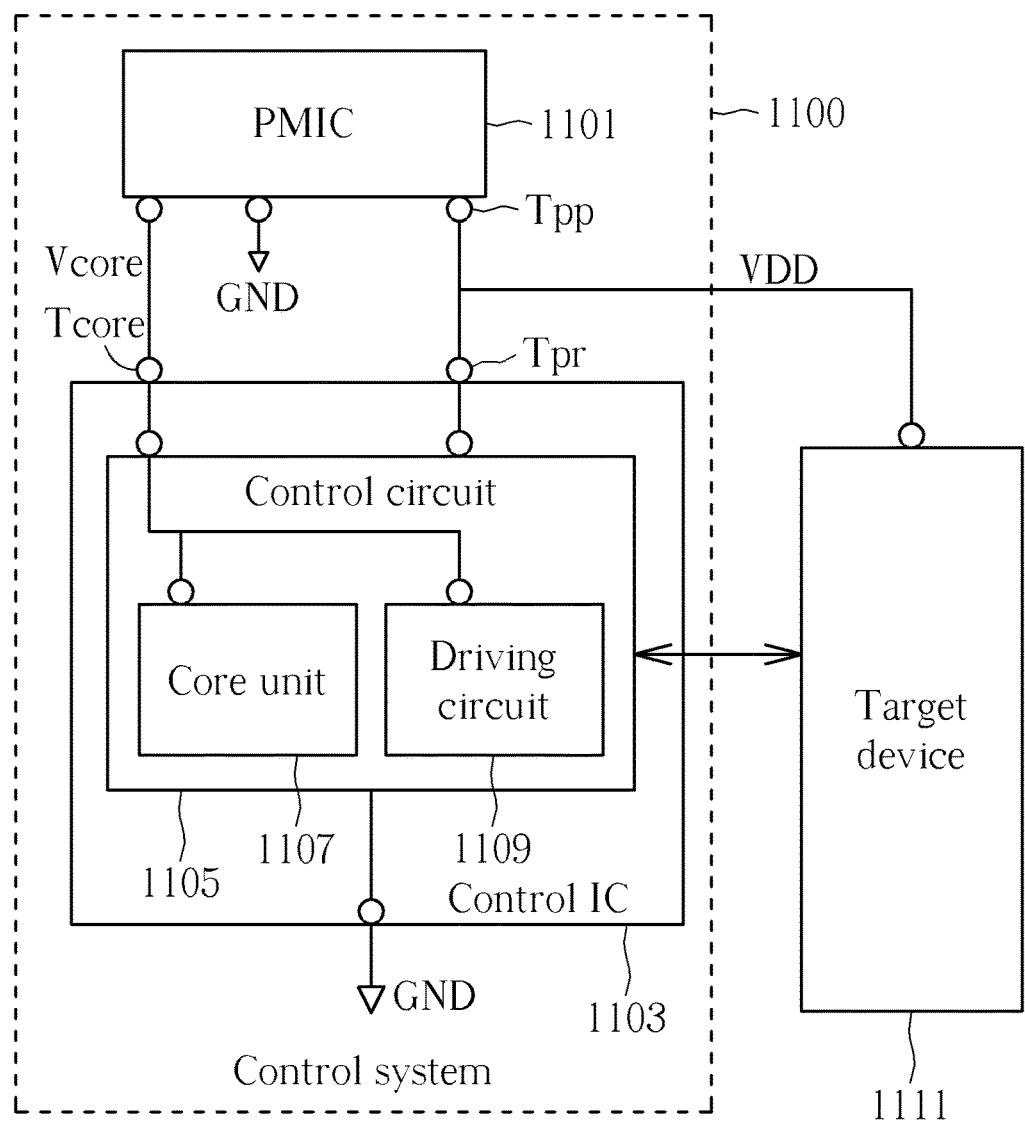

In the embodiment of FIG. 12, the control IC 1103 does not directly receive the bias voltage Vb from the power managing IC 1101. The power managing IC 1101 provides the core voltage Vcore to either the core unit 1107 or the driving circuit 1109 via the core voltage receiving terminal Tcore. In such case, the bias voltage can equal to the core voltage Vcore or the predetermined voltage minus the core voltage VDD-Vcore (ex. the embodiment in FIG. 3A or FIG. 3B). In the case that the bias voltage equals to the core voltage Vcore (ex. the embodiment in FIG. 5), the core voltage receiving terminal Tcore can be regarded as a bias voltage receiving terminal. However, in the case that the bias voltage equals to the predetermined voltage minus the core voltage VDD-Vcore, a bias generating circuit such as 301 in FIG. 3A is needed.

Figure 13:
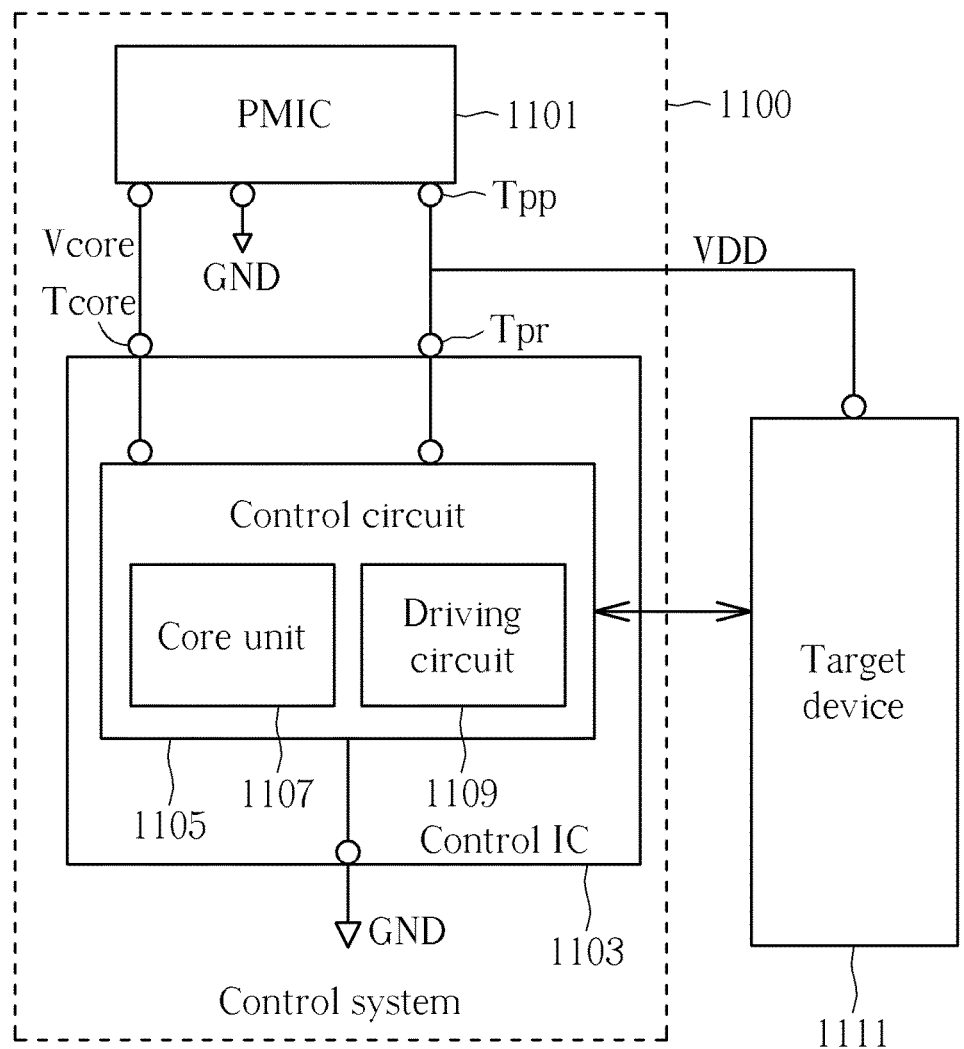

In the embodiment of FIG. 13, the control IC 1103 does not receive the bias voltage Vb from the power managing IC 1101. The power managing IC 1101 provides the core voltage Vcore to the core unit 1107 but not to the driving circuit 1109. In such case, the driving circuit 1109 receives the core voltage Vcore from the core unit 201 if needed. Also, the bias voltage can equal to the core voltage Vcore or the predetermined voltage minus the core voltage VDD-Vcore (ex. the embodiment in FIG. 3A or FIG. 3B). In the case that the bias voltage equals to the core voltage Vcore, the core voltage Vcore is directly applied as the bias voltage from the core unit 1107. However, in the case that the bias voltage equals to the predetermined voltage minus the core voltage VDD-Vcore, a bias generating circuit such as 301 in FIG. 3A is needed.

Figure 14:
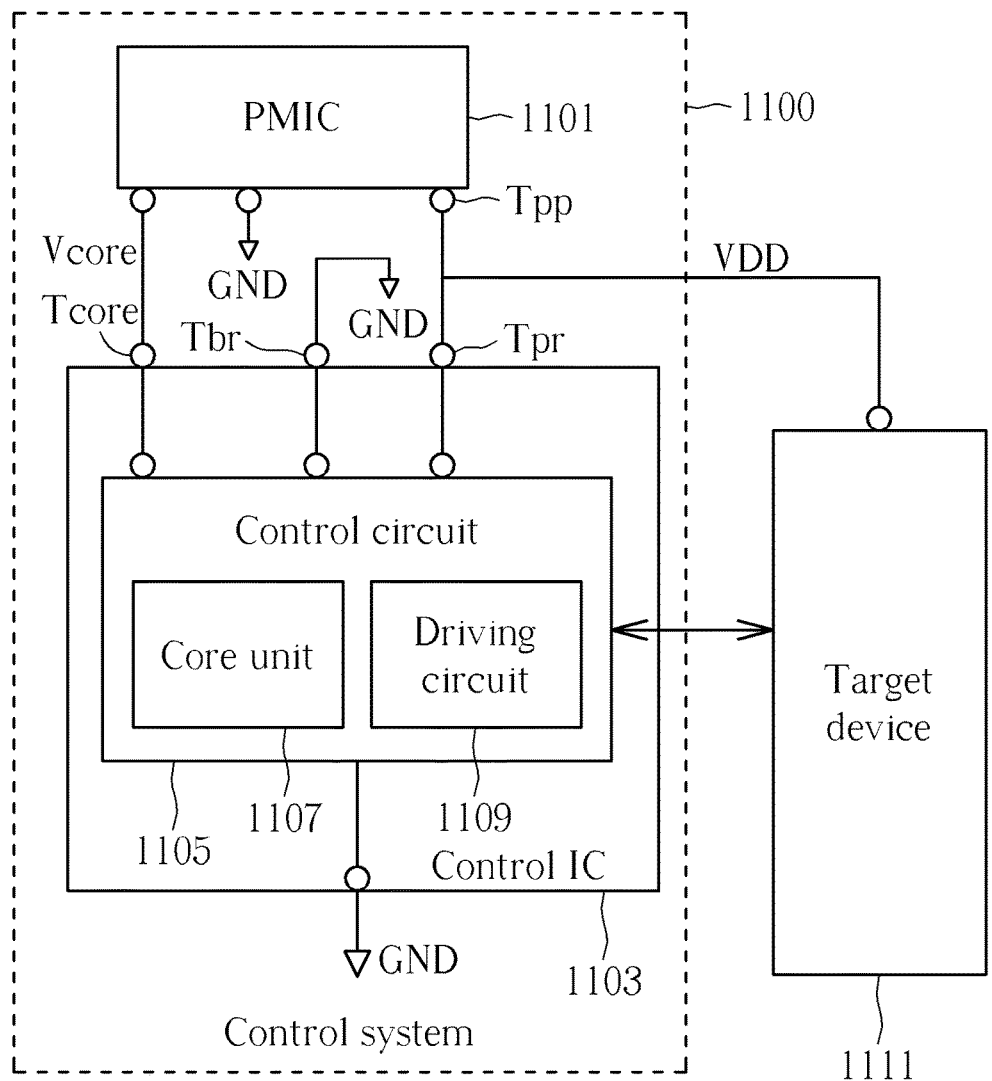
Figure 15:
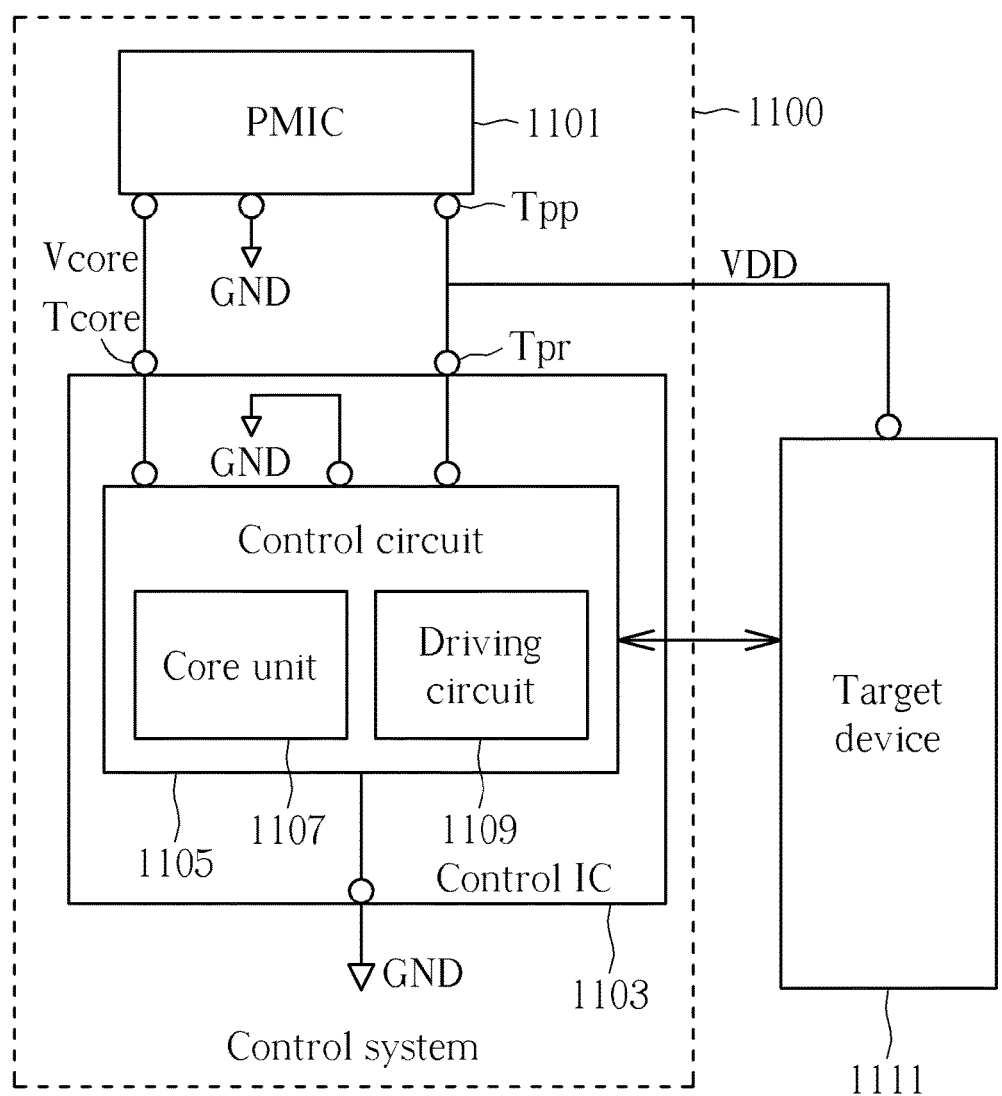
Figure 16:
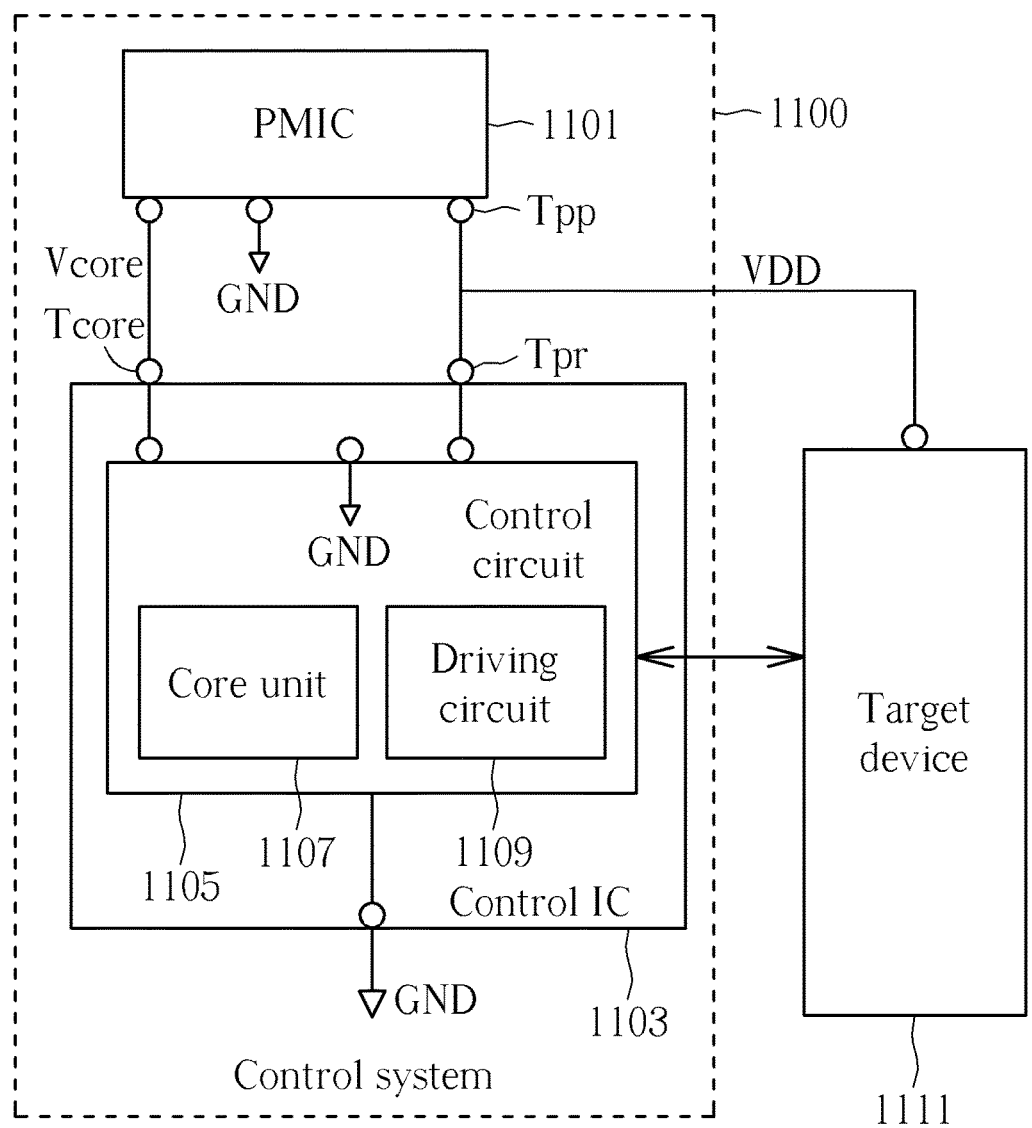

If the bias voltage equals to a ground voltage GND, the bias voltage receiving terminal Tbr can be coupled to a ground voltage source providing the ground voltage. In one embodiment, the control system 1100 is provided on a circuit board, and the ground voltage source is located on the circuit board, as shown in FIG. 14. Also, in one embodiment, the driving circuit 1109 is provided in a silicon die, and the control IC 1103 is comprised in a package comprising the silicon die, the power receiving terminal Tpr and the bias voltage receiving terminal Tb. In such case, the ground voltage source can be located in the package and outside the silicon die, as shown in FIG. 15. Alternatively, the ground voltage source can be located in the silicon die, as shown in FIG. 16.

The embodiments in FIG. 11-FIG. 16 can be applied to a 1.2v CMOS logic device, following JESD 76-1 spec, or HSIC USB 2.0 spec, but not limited.

In view of above-mentioned embodiments, the driving circuit, the control circuit and the control system can provide bias voltages meeting different requirements, thus the applicability of the driving circuit, the control circuit and the control system is extended.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit, comprising:
   a driving circuit, comprising a voltage adjusting circuit for generating a control voltage, comprising a first transistor and a second transistor;
   wherein the first transistor comprises:
     a first terminal;
     a second terminal; and
     a control terminal, for receiving a bias voltage generated from at least operating voltage of the control circuit;
   wherein the second transistor comprises:
     a first terminal, coupled to a second terminal of the first transistor;
     a second terminal, for receiving a first predetermined voltage; and
     a control terminal, for receiving the control voltage;
   wherein the control circuit further comprises:
   a candidate voltage selecting circuit, for outputting one of a plurality of candidate voltages; and
   a multiplexer, for outputting one of the candidate voltage output from the candidate voltage selecting circuit and a ground voltage as the bias voltage;
   wherein the candidate voltages are related with the operating voltage of the control circuit and a predetermined voltage;
   wherein the control circuit controls a target device receiving the predetermined voltage.

2. The control circuit of claim 1, wherein the first transistor and the second transistor are both PMOSFETs, the first terminal are drain terminals, the second terminal are source terminals, and the control terminals are gate terminals.

3. The control circuit of claim 1, wherein the first transistor and the second transistor are both NMOSFETs, the first terminal are drain terminals, the second terminal are source terminals, and the control terminals are gate terminals.

4. The control circuit of claim 1, wherein the first terminal of the first transistor is coupled to an I/O pad.

5. The control circuit of claim 1, wherein the control circuit further comprises a core device receiving a core voltage, wherein the bias voltage equals to the core voltage.

6. The control circuit of claim 1, wherein the bias voltage is a ground voltage.

7. A control system, comprising:
   a power managing IC (integrated circuit), comprising a power providing terminal for providing a first predetermined voltage; and
   a control IC, comprising:
     at least one transistor;
     a power receiving terminal, for receiving the first predetermined voltage; and
     a bias voltage receiving terminal, for receiving a bias voltage generated from at least operating voltage of the control IC, wherein the bias voltage is applied to bias at least one transistor in the control IC;
   wherein the control IC further comprises a core device receiving a core voltage from the bias voltage receiving terminal, wherein the bias voltage equals to the core voltage.

8. The control system of claim 7, wherein the control IC comprises:
a voltage adjusting circuit, for generating a control voltage;
a first transistor, applied as the transistor, comprising:
a first terminal;
a second terminal; and
a control terminal, for receiving the bias voltage; and
a second transistor, comprising:
a first terminal, coupled to a second terminal of the first transistor;
a second terminal, for receiving the first predetermined voltage; and
a control terminal, for receiving the control voltage.

9. The control system of claim 8, wherein the control IC comprises an I/O pad, wherein the first terminal of the first transistor is coupled to the I/O pad.

10. The control system of claim 7, wherein the power managing IC provides the core voltage to the core device and the control IC via the bias voltage receiving terminal.

11. The control system of claim 7, wherein the power managing IC provides the core voltage to the core device via the bias voltage receiving terminal, and the core device provides the core voltage as the bias voltage.

12. A control system, comprising:
a power managing IC (integrated circuit), comprising a power providing terminal for providing a first predetermined voltage; and
a control IC, comprising:
at least one transistor;
a power receiving terminal, for receiving the first predetermined voltage;
a core voltage receiving terminal, for receiving a core voltage;
a core device, receiving the core voltage; and
a bias voltage generating circuit, for generating a bias voltage applied to bias the transistor in the control IC according to the core voltage;
wherein the bias voltage equals to the first predetermined voltage minus the core voltage.

13. The control system of claim 12, wherein the power managing IC provides the core voltage to the core device and the control IC via the core voltage receiving terminal, thereby the bias voltage generating circuit generates the bias voltage according to the core voltage.

14. The control system of claim 12, wherein the power managing IC provides the core voltage to the core device via the core voltage receiving terminal, wherein the core device outputs the core voltage thereby the bias voltage generating circuit generate the bias voltage according to the core voltage.

15. A control system, comprising:
a power managing IC (integrated circuit), comprising a power providing terminal for providing a first predetermined voltage; and
a control IC, comprising:
at least one transistor;
a power receiving terminal, for receiving the first predetermined voltage; and
a bias voltage receiving terminal, for receiving a bias voltage generated from at least operating voltage of the control IC, wherein the bias voltage is applied to bias at least one transistor in the control IC;
wherein the power managing IC provides the bias voltage to the bias voltage receiving terminal.

16. A control system, comprising:
a power managing IC (integrated circuit), comprising a power providing terminal for providing a first predetermined voltage; and
a control IC, comprising:
at least one transistor;
a power receiving terminal, for receiving the first predetermined voltage; and
a bias voltage receiving terminal, for receiving a bias voltage generated from at least operating voltage of the control IC, wherein the bias voltage is applied to bias at least one transistor in the control IC;
wherein the bias voltage is a ground voltage;
wherein the control IC comprises:
a silicon die, wherein the transistor is provided in the silicon die; and
a package, comprising the silicon die, the power receiving terminal, and the bias voltage receiving terminal;
wherein a ground voltage source providing the ground voltage is located in the package and outside the silicon die.

17. A control system, comprising:
a power managing IC (integrated circuit), comprising a power providing terminal for providing a first predetermined voltage; and
a control IC, comprising:
at least one transistor;
a power receiving terminal, for receiving the first predetermined voltage; and
a bias voltage receiving terminal, for receiving a bias voltage generated from at least operating voltage of the control IC, wherein the bias voltage is applied to bias at least one transistor in the control I;
wherein the bias voltage is a ground voltage;
wherein the control IC comprises:
a silicon die, wherein the transistor is provided in the silicon die; and
a package, comprising the silicon die, the power receiving terminal, and the bias voltage receiving terminal;
wherein a ground voltage source providing the ground voltage is located in the silicon die.

* * * * *